(12) United States Patent
Kumar Agrawal et al.

(10) Patent No.: US 12,423,248 B2
(45) Date of Patent: Sep. 23, 2025

(54) AUTOMATIC INPUT STYLE SELECTION FOR A CONNECTED DEVICE

(71) Applicant: Motorola Mobility LLC, Chicago, IL (US)

(72) Inventors: Amit Kumar Agrawal, Bangalore (IN); Jeffrey Thomas Snow, Barrington, IL (US); Olivier David Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 130 days.

(21) Appl. No.: 18/218,284

(22) Filed: Jul. 5, 2023

(65) Prior Publication Data

US 2025/0013582 A1    Jan. 9, 2025

(51) Int. Cl.
*G06F 13/10*    (2006.01)
(52) U.S. Cl.
CPC .................. *G06F 13/102* (2013.01)
(58) Field of Classification Search
CPC ..................................... G06F 13/102
USPC ............................................. 710/8
See application file for complete search history.

(56) References Cited

U.S. PATENT DOCUMENTS

| | | | |
|---|---|---|---|
| 11,120,765 B1 * | 9/2021 | Agrawal | ............... G09G 5/003 |
| 11,594,193 B2 | 2/2023 | Agrawal et al. | |
| 12,125,456 B2 | 10/2024 | Agrawal et al. | |
| 2010/0245210 A1 | 9/2010 | Lee | |
| 2011/0298700 A1 | 12/2011 | Ito et al. | |
| 2012/0218191 A1 * | 8/2012 | Huang | ................ G06F 3/04883 345/173 |
| 2018/0225036 A1 | 8/2018 | Mangeym et al. | |
| 2019/0235707 A1 * | 8/2019 | Missig | ................ G06F 3/04883 |
| 2020/0042274 A1 | 2/2020 | Park et al. | |
| 2020/0104089 A1 * | 4/2020 | Chen | .................... G06F 3/04886 |
| 2022/0093054 A1 * | 3/2022 | Agrawal | ............... G06F 3/1407 |
| 2022/0391158 A1 * | 12/2022 | Lemmens | ............. G06F 3/1438 |
| 2023/0222989 A1 * | 7/2023 | Agrawal | ............... G06F 3/0488 345/1.1 |

OTHER PUBLICATIONS

U.S. Appl. No. 18/174,898 , "Notice of Allowance", U.S. Appl. No. 18/174,898, filed Jun. 20, 2024, 9 pages.
"Corrected Notice of Allowability", U.S. Appl. No. 17/026,949, filed Aug. 18, 2021, 2 pages.

(Continued)

*Primary Examiner* — Christopher B Shin
(74) *Attorney, Agent, or Firm* — FIG. 1 Patents

(57) ABSTRACT

An electronic device (e.g., a smartphone or tablet) can be connected to another electronic device that is typically a computing device (e.g., a mobile device such as a laptop or a non-mobile device such as a desktop computer or workstation), allowing the electronic devices to be used together. This connection can be a wired connection or a wireless connection. When the electronic device and the computing device are connected, and optionally also when a universal control mode is activated, the electronic device automatically operates in a non-gesture-based input style, allowing a single input control device (e.g., a trackpad on a laptop) to control user input for both devices.

20 Claims, 8 Drawing Sheets

(56) References Cited

OTHER PUBLICATIONS

"NexDock", NexDock Website [retrieved Sep. 3, 2020]. Retrieved from the Internet: <http://nexdock.com/>, Sep. 3, 2020, 10 pages.
"Notice of Allowability", U.S. Appl. No. 17/026,949, filed Jun. 30, 2021, 4 pages.
"Notice of Allowance", U.S. Appl. No. 17/026,949, filed Jun. 14, 2021, 10 pages.
"Universal Control: Use a single keyboard and mouse between Mac and iPad", Apple Inc. [retrieved Jul. 19, 2023]. Retrieved from the Internet <https://support.apple.com/en-in/HT212757>., 5 Pages.
"Vysor", Vysor Website, [retrieved Sep. 9, 2020]. Retrieved from the Internet: <https://www.vysor.io/>, Sep. 9, 2020, 4 pages.
U.S. Appl. No. 17/399,779 , "Non-Final Office Action", U.S. Appl. No. 17/399,779, filed Aug. 24, 2022, 5 pages.
U.S. Appl. No. 17/399,779 , "Notice of Allowance", U.S. Appl. No. 17/399,779, filed Dec. 12, 2022, 5 pages.
Huculak, Mauro , "How to disable touch on a display on Windows 10", Windows Central, [retrieved Sep. 16, 2020]. Retrieved from the Internet: <https://www.windowscentral.com/how-disable-touch-display-windows-10>, Aug. 26, 2019, 14 pages.
Summerson, Cameron , "How to Easily Mirror Your Android Phone's Screen on Your PC with Vysor for Chrome", Computer Guru, [retrieved Sep. 3, 2020]. Retrieved from the Internet: <https://www.howtogeek.com/257023/how-to-easily-mirror-your-android-phones-screen-on-your-pc-with-vysor-for-chrome/>, Jul. 12, 2017, 7 pages.

\* cited by examiner

AUTOMATIC INPUT STYLE SELECTION FOR A CONNECTED DEVICE

BACKGROUND

As technology has advanced, our uses for electronic devices have expanded. One such use is small mobile devices, such as smartphones, which have become increasingly powerful despite their small size. These mobile devices provide a great deal of portable processing power but are not without their problems. One such problem is that situations arise in which users desire to use their mobile devices alongside other electronic devices, such as a laptop computer. This can result in the user having to interact with the two devices separately, which can be frustrating for users and lead to user frustration with their devices.

BRIEF DESCRIPTION OF THE DRAWINGS

Embodiments of automatic input style selection for a connected device are described with reference to the following drawings. The same numbers are used throughout the drawings to reference like features and components.

DETAILED DESCRIPTION

Automatic input style selection for a connected device is discussed herein. Generally, an electronic device (e.g., a smartphone or tablet) can be connected to another electronic device that is typically a computing device (e.g., a mobile device such as a laptop or a non-mobile device such as a desktop computer or workstation), allowing the electronic devices to be used together. This connection can be a wired connection or a wireless connection. When the electronic device and the computing device are connected, and optionally also when a universal control mode is activated, the electronic device automatically operates in a non-gesture-based input style, allowing a single input control device (e.g., a trackpad on a laptop) to control user input for both devices.

The techniques discussed herein improve the operation of an electronic device by automatically adapting the computing device to the non-gesture-based input style used by the electronic device to which the computing device is connected. This allows the user to use the two devices concurrently with the same input device (e.g., trackpad, mouse, and so forth).

Figure 1:
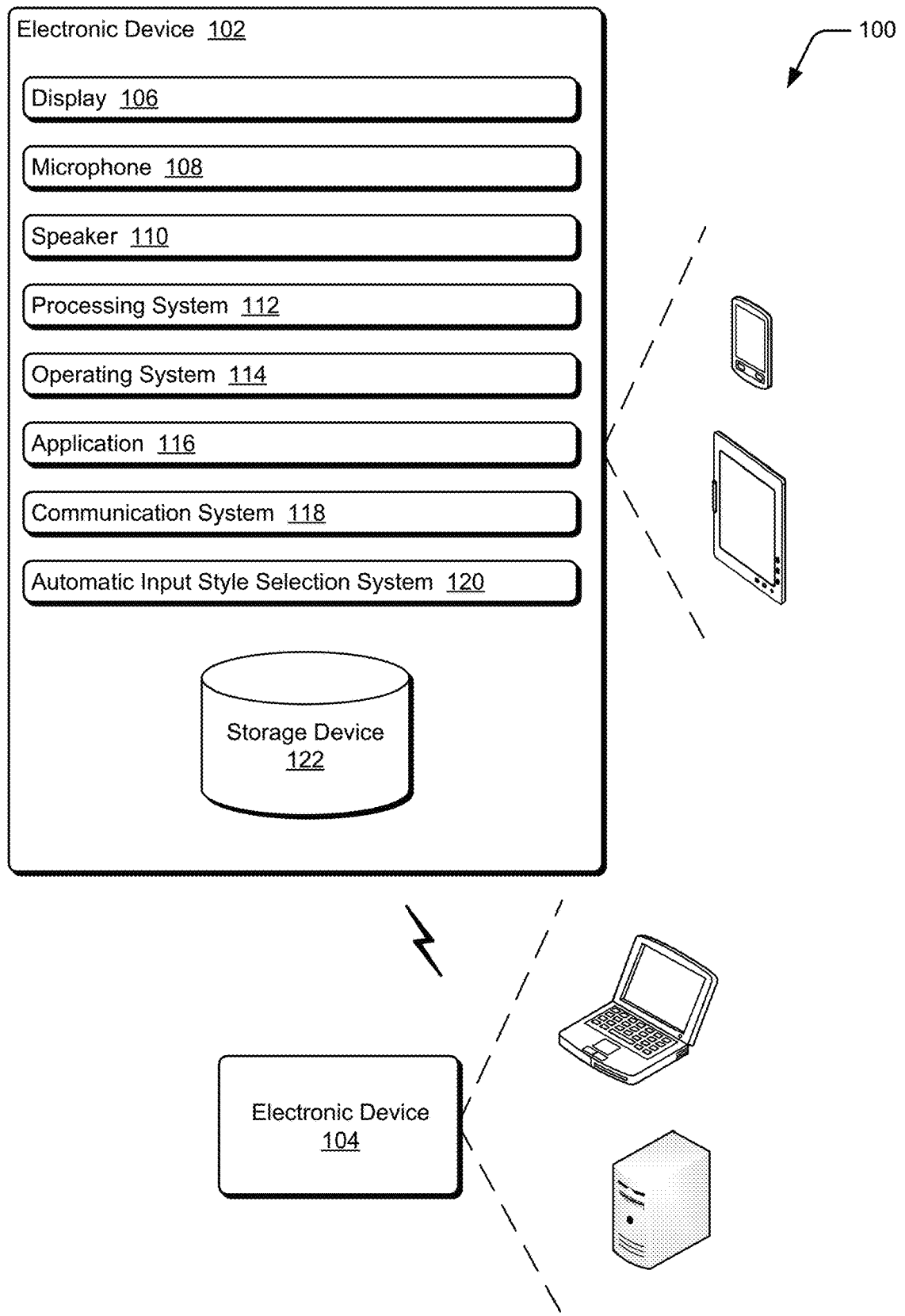
FIG. 1 illustrates an example system implementing the techniques discussed herein.

FIG. 1 illustrates an example system 100 implementing the techniques discussed herein. The system 100 includes an electronic device 102 that can be, or include, many different types of computing or electronic devices. For example, the electronic device 102 can be a computing device, such as a smartphone or other wireless phone, a tablet, and so forth. The system 100 also includes an electronic device 104, which can also be many different types of computing or electronic devices, but is typically a different type of electronic device than the electronic device 102. For example, the electronic device 102 can be a laptop computer, a desktop computer, an automotive computer, a tablet, and so forth.

The electronic device 102 is a touch-enabled device. A touch-enabled device refers to a device that receives touch inputs via the display (e.g., a touchscreen). A touch-enabled device may also receive inputs via other input mechanisms, such as trackpad, mouse, physical keyboard, and so forth. A non-touch-enabled device refers to a device that does not receive touch inputs via the display (e.g., a touchscreen). Accordingly, a non-touch-enabled receives inputs via other input mechanisms, such as trackpad, mouse, physical keyboard, and so forth.

The electronic device 104 can be touch enabled or not touch enabled.

The electronic device 102 includes a display 106. The display 106 can be configured as any suitable type of display, such as an organic light-emitting diode (OLED) display, active matrix OLED display, liquid crystal display (LCD), in-plane shifting LCD, projector, and so forth.

The electronic device 102 also includes a microphone 108 and a speaker 110. The microphone 108 can be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the electronic device 102, it should be noted that one or more of the microphone 108 and the speaker 110 can be implemented separately from the electronic device 102. In such situations, the electronic device 102 can communicate with the microphone 108 or the speaker 110 via any of a variety of wired (e.g., Universal Serial Bus (USB), USB-C, IEEE 1394, or wireless (e.g., Wi-Fi, Bluetooth, infrared (IR)) connections. For example, the microphone 108 may be separate from the electronic device 102 and voice inputs received by the microphone 108 are communicated to the electronic device 102 via an IR or radio frequency wireless connection.

The electronic device 102 also includes a processing system 112 that includes one or more processors, each of which can include one or more cores. The processing system 112 is coupled with, and may implement functionalities of, any other components or modules of the electronic device 102 that are described herein. In one or more embodiments, the processing system 112 includes a single processor having a single core. Alternatively, the processing system 112 includes a single processor having multiple cores or multiple processors (each having one or more cores).

The electronic device 102 also includes an operating system 114. The operating system 114 manages hardware, software, and firmware resources in the electronic device 102. The operating system 114 manages one or more applications 116 running on the electronic device 102 and operates as an interface between applications 116 and hardware components of the electronic device 102.

The electronic device 102 also includes a communication system 118. The communication system 118 manages communication with external display device 104 and optionally various other devices. The electronic device 102 can be connected to the external display device 104 and communicate with the external display device 104 using any of a variety of wired or wireless connections, such as USB, USB-C, WiFi™, WiFi™ IP (Internet Protocol), USB IP, Bluetooth™, DisplayPort, High-Definition Multimedia Interface (HDMI), and so forth. Typically, the electronic device 102 is removably connected to the external display device 104, allowing the external display device 104 to be connected to the external display device 104 and subsequently disconnected from the external display device 104.

The electronic device 102 also includes an automatic input style selection system 120. An input style refers to the manner in which the user navigates through different views, windows, or screens of a device. The automatic input style selection system 120 automatically selects from one of multiple different input styles supported by the electronic device 102 and is made based on whether the electronic device 102 is connected to the electronic device 104.

Different input styles are supported by the operating system 114 and applications 116. In one or more embodiments, the electronic device 102 supports a gesture-based input style and a non-gesture-based input style. The gesture-based input style refers to receiving user inputs that are gestures on a touch sensitive device (e.g., a touchscreen display 106, a trackpad), such as a swipe, a touch and hold action, a multi-finger swipe or movement, combinations thereof, and so forth. These gestures can also be referred to as touchscreen gestures or touch gestures. The non-gesture-based input style refers to receiving user inputs that are not gestures and that do not require use of a touch sensitive device, such as user inputs to select one or more buttons (e.g., mouse clicks on a virtual button, pressing a physical button). Although these one or more buttons in a non-gesture-based input style may be virtual buttons displayed on a touchscreen display 106 and may be selected by tapping on the virtual button, the buttons are either activated if touched or not activated if not touched, there is no movement across the touchscreen display 106 (e.g., no swipe) and no touch and hold (the button is either touched or not touched).

The automatic input style selection system 120 can be implemented in a variety of different manners. For example, the automatic input style selection system 120 can be implemented as multiple instructions stored on computer-readable storage media and that can be executed by the processing system 112. Additionally or alternatively, the automatic input style selection system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The electronic device 102 also includes a storage device 122. The storage device 122 can be implemented using any of a variety of storage technologies, such as magnetic disk, optical disc, Flash, or other solid state memory, and so forth. The storage device 122 can store various program instructions and data for any one or more of the operating system 114, application 116, and the automatic input style selection system 120.

In one or more implementations, the electronic device 104 includes components analogous to those discussed above with reference to the electronic device 102, such as a display, a microphone, a speaker, a processing system, an operating system, an application, a communication system, and a storage device. However, the electronic device 104 may not include an automatic input style selection system.

Figure 2:
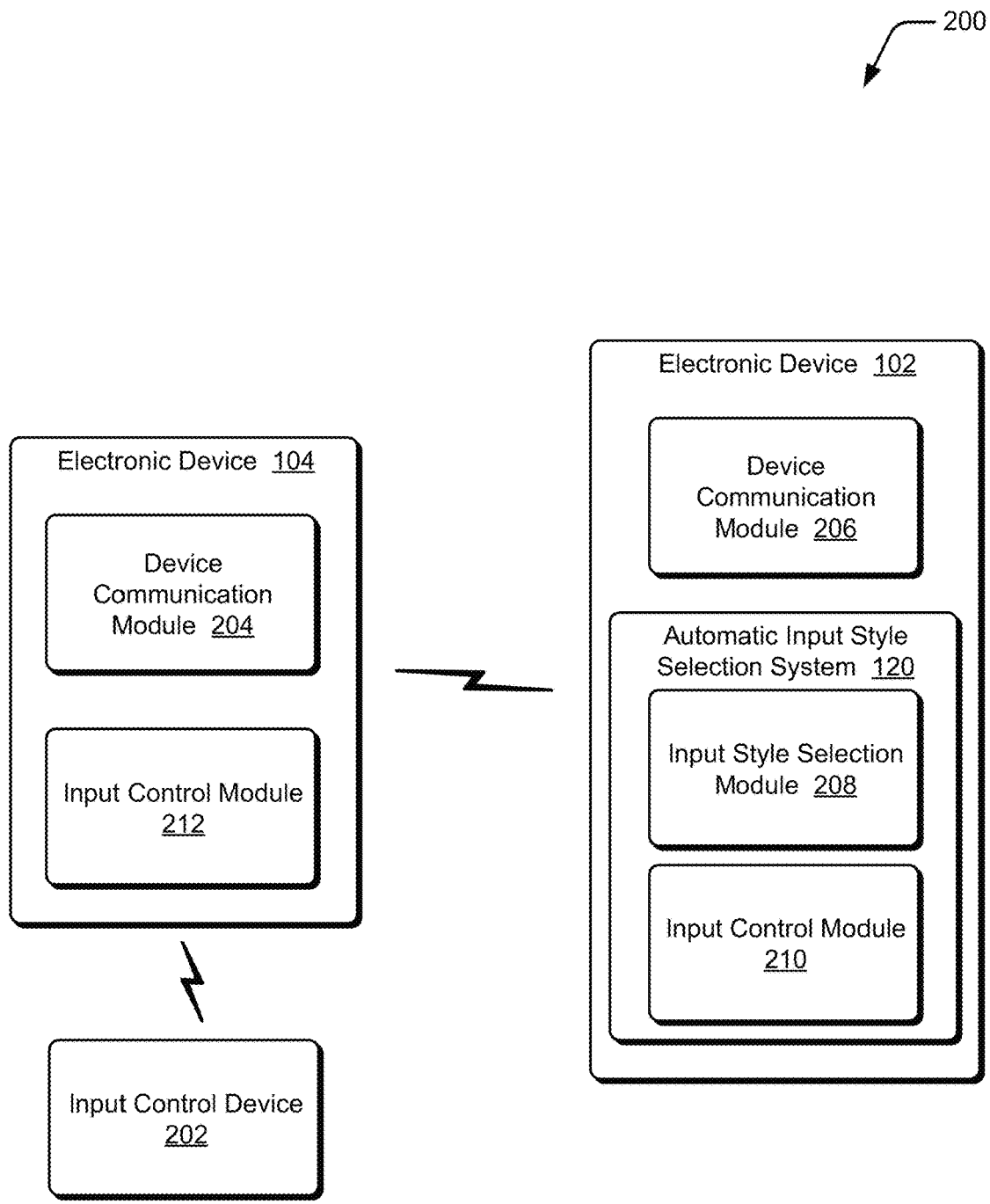
FIG. 2 illustrates an example architecture implementing the techniques discussed herein.

FIG. 2 illustrates an example architecture 200 implementing the techniques discussed herein. The architecture 200 includes the electronic device 102, the electronic device 104, and an input control device 202. The input control device 202, which may also be referred to as a cursor control device or a pointer control device, can be implemented in any of a variety of manners. For example, the input control device 202 may be a mouse, trackpad, keyboard, and so forth. Although illustrated as separate from the electronic device 104, in one or more implementations the input control device 202 is part of the electronic device 104 (e.g., a trackpad of a laptop device).

The electronic device 104 includes a device communication module 204 that implements functionality to detect when the electronic device 104 is connected to the electronic device 102 and to communicate with the electronic device 102 (e.g., send and receive various signals, data, and so forth). Similarly, the electronic device 102 includes a device communication module 206 that implements functionality to detect when the electronic device 102 is connected to the electronic device 104 and to communicate with the electronic device 104 (e.g., send and receive various signals, data, and so forth).

The device communication module 204 can detect that the electronic device 104 is connected to the electronic device 102 (and similarly the device communication module 206 can detect that the electronic device 102 is connected to the electronic device 104) using any of a variety of public or proprietary techniques. For example, the device communication module 204 can transmit a signal that is received by the device communication module 206 indicating that the electronic device 104 is connected to the electronic device 102.

The electronic device 102 also includes the automatic input style selection system 120, which includes an input style selection module 208 and an input control module 210. In response to detecting that the electronic device 102 and the electronic device 104 are connected, the input style selection module 208 selects the non-gesture-based input style setting for the electronic device 102. An indication of the selected input style may then be provided to the operating system 114 or an application 116. This allows the user to interact with the electronic device 102 using the input control device 202 in a manner analogous to the user interacting with the electronic device 104.

In one or more implementations, the input style selection module 208 also maintains a record of the current input style prior to selection of the non-gesture-based input style. Similar to the discussion above, in response to the electronic device 102 being disconnected from the electronic device 104, the input style selection module 208 selects the saved input style. An indication of the selected input style may then be provided to the operating system 114 or an application 116. Accordingly, the electronic device 102 returns to using the input style that the electronic device 102 was using before being connected to the electronic device 104.

As discussed above, the input style selection module 208 selects the non-gesture-based input style setting for the electronic device 102 in response to detecting that the electronic device 102 and the electronic device 104 are connected. In one or more implementations, the input style selection module 208 also determines whether a universal control mode has been activated or turned on. When activated or turned on, the universal control mode indicates that the electronic device 102 and the electronic device 104 are to be controlled in the same manner (e.g., use the same input style). Accordingly, the input style selection module 208 selects the non-gesture-based input style setting for the electronic device 102 in response to detecting that the electronic device 102 and the electronic device 104 are connected as well as the universal control mode being turned on or activated. The input style selection module 208 leaves the input style selection module at its current setting (e.g., does not select a new input style) if the electronic device 102 and the electronic device 104 are not connected or the universal control mode is turned off or deactivated.

The input style selection module 208 can determine whether the universal control mode is activated or deactivated in any of a variety of different manners. In one or more implementations, a user input is received indicating whether the universal control mode is activated or deactivated and an indication whether the universal control mode is activated or deactivated is saved as a configuration setting. Additionally or alternatively, the operating system 114 or an application 116 may specify whether the universal control mode is activated or deactivated.

In one or more implementations, the input style selection module 208 determines whether universal control mode is activated or deactivated and provides an indication of such to the electronic device 104. A input control module 212 of the electronic device 104 can then determine whether to transmit indications of user inputs to the electronic device 102 as discussed in more detail below. Additionally or alternatively, the electronic device 104 includes an input style selection module (not shown) analogous to the input style selection module 208. In such situations, the input style selection module in the electronic device 104 determines whether universal control mode is activated or deactivated and provides an indication of such to the electronic device 102.

While using the non-gesture-based input style, the electronic device 104 receives user input via the input control device 202. This user input can take various forms, such as movement of a cursor or pointer, selection of a button or switch, selection of a pull-down menu, and so forth. The input control module 212 receives this user input and performs whatever action is indicated by the user input, such as moving a pointer or cursor, activating or selecting a button that is clicked on, and so forth, or provides an indication of the user input to the input control module 210 of the electronic device 104. This indication of the user input can include various information, such as a direction of movement of the input control device 202, an amount or length of movement of the input control device 202, user activation of a button (e.g., a mouse click), and so forth. The input control module 212 performs whatever action is indicated by the received indication, such as moving a pointer or cursor, activating or selecting a button that is clicked on, and so forth.

Whether the input control module 212 performs the action indicated by the user input or provides an indication of the user input to the input control module 210 depends on the user input and a current location of a pointer or cursor. The input control module 212 knows the dimensions of a display of the electronic device 104 and keeps track of the current location of the pointer or cursor on the display of the electronic device 104. The input control module 212 also knows the location of the electronic device 102 relative to the electronic device 104 (e.g., whether the electronic device 102 is to the left of the electronic device 104, the electronic device 102 is to the right of the electronic device 104, and so forth). The input control module 212 can determine the location of the electronic device 102 relative to the electronic device 104 in any of a variety of manners, such as by receiving a user input indicating the location, by accessing a configuration setting of the electronic device 104 or the electronic device 102 (e.g., which may be set by a user of the electronic device 104 or the electronic device 102, by a system administrator of the electronic device 102 or the electronic device 102, by a developer or distributor of the electronic device 104 or the 102, and so forth), by analyzing signals received from the electronic device 102 (e.g., if sensors or microphones are on the left and right side of the electronic device 104, which sensors or microphones receive a signal or audio from the electronic device 102 first), and so forth.

The electronic device 102 can similarly determine the location of the electronic device 104 relative to the electronic device 102 in various manners analogous to the discussion above regarding the electronic device 104 determining the location of the electronic device 102 relative to the electronic device 104. Additionally or alternatively, the electronic device 102 may receive an indication of the location of the electronic device 102 relative to the electronic device 104 as determined by the electronic device 104. Additionally or alternatively, the electronic device 104 may receive an indication of the location of the electronic device 104 relative to the electronic device 102 as determined by the electronic device 102.

If user input would result in moving the pointer or cursor off the display on the electronic device 104 in the direction of the electronic device 102, the input control module 212 stops displaying the pointer or cursor on the display of the electronic device 104 and also provides the indication of the user input to the input control module 210 so that the input control module 210 can display and move the pointer or cursor appropriately on the display of the electronic device 102, or select the appropriate button on the display of the electronic device 102. Similarly, if the user input then moves the pointer or cursor off the display on electronic device 102 in the direction of the electronic device 104, the input control module 210 stops displaying the cursor or pointer on the display of the electronic device 102, the input control module 212 stops providing the indication of the user input to the input control module 210 and the input control module 212 displays and moves the pointer or cursor appropriately, or selects the appropriate button, on the display of the electronic device 104.

In one or more implementations, the input control module 212 displays an indication when the user input is close to moving the pointer or cursor off the display of the electronic device 104 and onto the display of the electronic device 102. This closeness can be determined in various manners, such as the pointer or cursor being within a threshold distance (e.g., a threshold number of pixels) of the edge of the display of the electronic device 104. The displayed indication can take various forms, such as a rectangular box along the edge of the display of the electronic device 104 with a particular fill or color (e.g., a green box), changing the manner in which the pointer or cursor is displayed (e.g., changing the color of the pointer or cursor), and so forth.

Additionally or alternatively, the input control module 210 displays an indication when the user input is close to moving the pointer or cursor off the display of the electronic device 102 and onto the display of the electronic device 104. This closeness can be determined in various manners, such as the pointer or cursor being within a threshold distance (e.g., a threshold number of pixels) of the edge of the display of the electronic device 102. The displayed indication can take various forms, such as a rectangular box along the edge of the display of the electronic device 102 with a particular fill or color (e.g., a green box), changing the manner in which the pointer or cursor is displayed (e.g., changing the color of the pointer or cursor), and so forth.

In one or more implementations, the input style selection module 208 maintains a record of the current input style prior to selection of the non-gesture-based input style as discussed above. Similar to the discussion above, in response to the electronic device 102 being disconnected from the electronic device 104 or the universal control mode being deactivated, the input style selection module 208 selects the saved input style. An indication of the selected input style may then be provided to the operating system 114 or an application 116. Accordingly, the electronic device 102 returns to using the input style that the electronic device 102 was using before being connected to the electronic device 104 and before the universal control mode was activated.

It should be noted that in some situations the height or width of the display of the electronic device 104 may be different than the height or width of the display of the electronic device 102. In such situations, various techniques can be used when the user input moves the pointer or cursor from one display to the other. For example, if the height of the display of the electronic device 104 is larger than the height of the display of the electronic device 102 and the cursor is at the top of the display of the electronic device 104, then the pointer or cursor may be moved to the top of the display of the electronic device 102. By way of another example, if the height of the display of the electronic device 104 is larger than the height of the display of the electronic device 102 and the cursor is at the top of the display of the electronic device 104, then the pointer or cursor may not be moved to the display of the electronic device 102 until further user input moves the pointer or cursor down to the height of the top of the display of the electronic device 102.

FIGS. 3, 4, 5, and 6 illustrate examples of using the techniques discussed herein. These examples in FIGS. 3, 4, 5, and 6 illustrate scenarios where the electronic device 102 is a computing device (e.g., a smartphone) in a holder or stand to the right of the electronic device 104, which is a laptop computer. It is to be appreciated that these are only examples and that the electronic devices can be at any location relative to each other (e.g., the electronic device 102 can be to the left or right of the electronic device 104, the electronic device 102 can be above or below the electronic device 104, the electronic device 102 can be diagonal from the electronic device 104 (e.g., upper right, lower left), and so forth).

Figure 3:
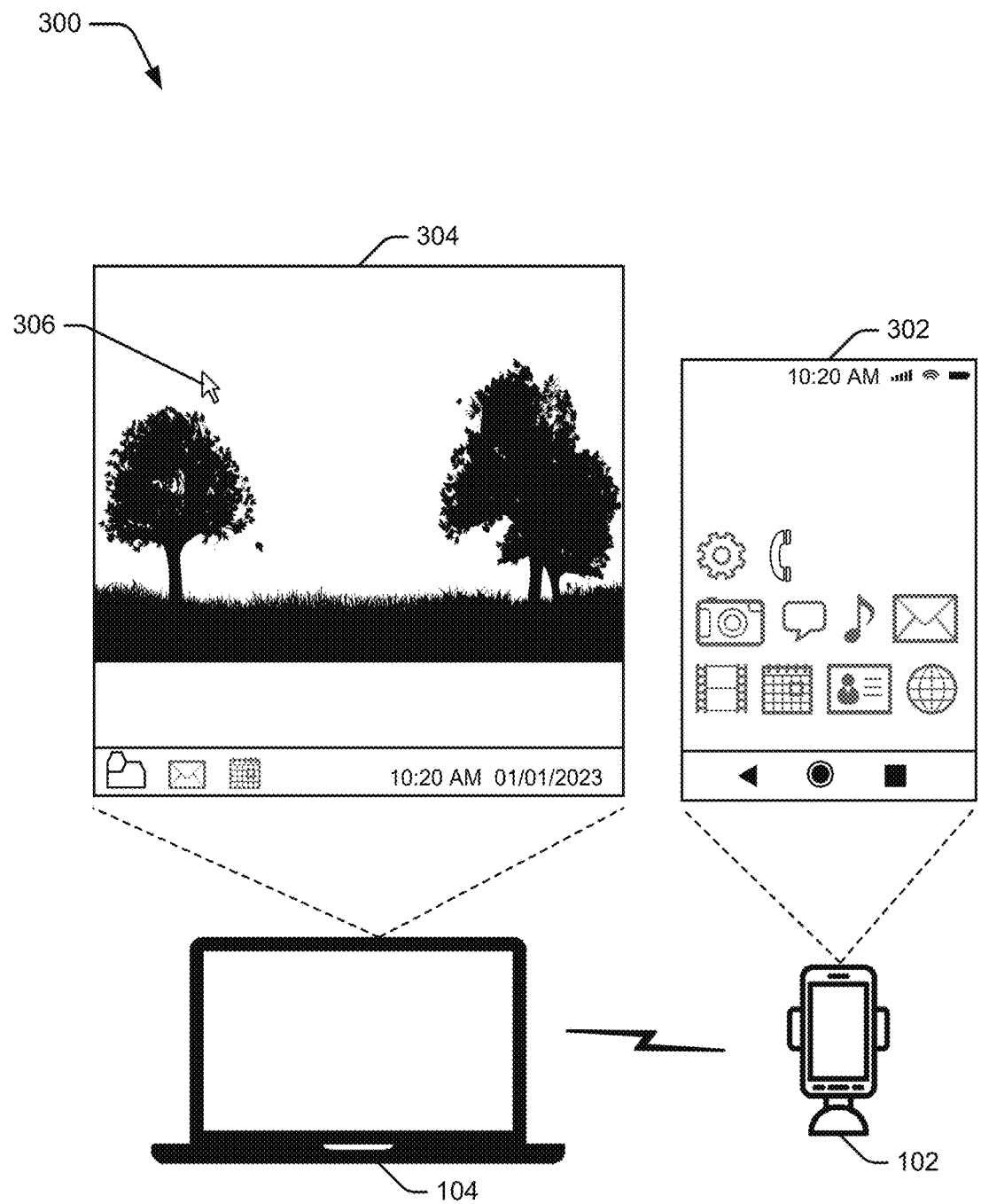
FIGS. 3, 4, 5, and 6 illustrate examples of using the techniques discussed herein.

FIG. 3 illustrates an example 300 of using the techniques discussed herein. The example 300 includes the electronic device 102 and the electronic device 104. The electronic device 102 displays on its display a user interface 302 including multiple icons that can be selected to perform various operations or run various applications (e.g., a phone icon selectable to launch a phone application, a music icon selectable to launch a music playback application). The electronic device 104 displays on its display a user interface 304 including a background image (e.g., wallpaper) of trees and grass, and a toolbar including multiple icons that can be selected to perform various operations or run various applications (e.g., an envelope icon selectable to launch an email application, a calendar icon selectable to launch a calendar application). The toolbar also includes additional information such as a current time (e.g., 10:20 AM) and a current date (e.g., 01/01/2023). The user interface 304 also includes a pointer 306 that is controlled by an input control device of the electronic device 104 (e.g., a trackpad that is part of the electronic device 104).

In the example 300, the user input via the input control device of the electronic device 104 has resulted in the pointer 306 being located on the display of the electronic device 104. Accordingly, no pointer is displayed on the display of the electronic device 102.

As illustrated in the example 300, different user interfaces are displayed by the electronic devices 102 and 104. The user interface displayed on the display of the electronic device 102 is not mirrored on the display of the electronic device 104, is not displayed within a window on the display of the electronic device 104, and so forth.

Figure 4:
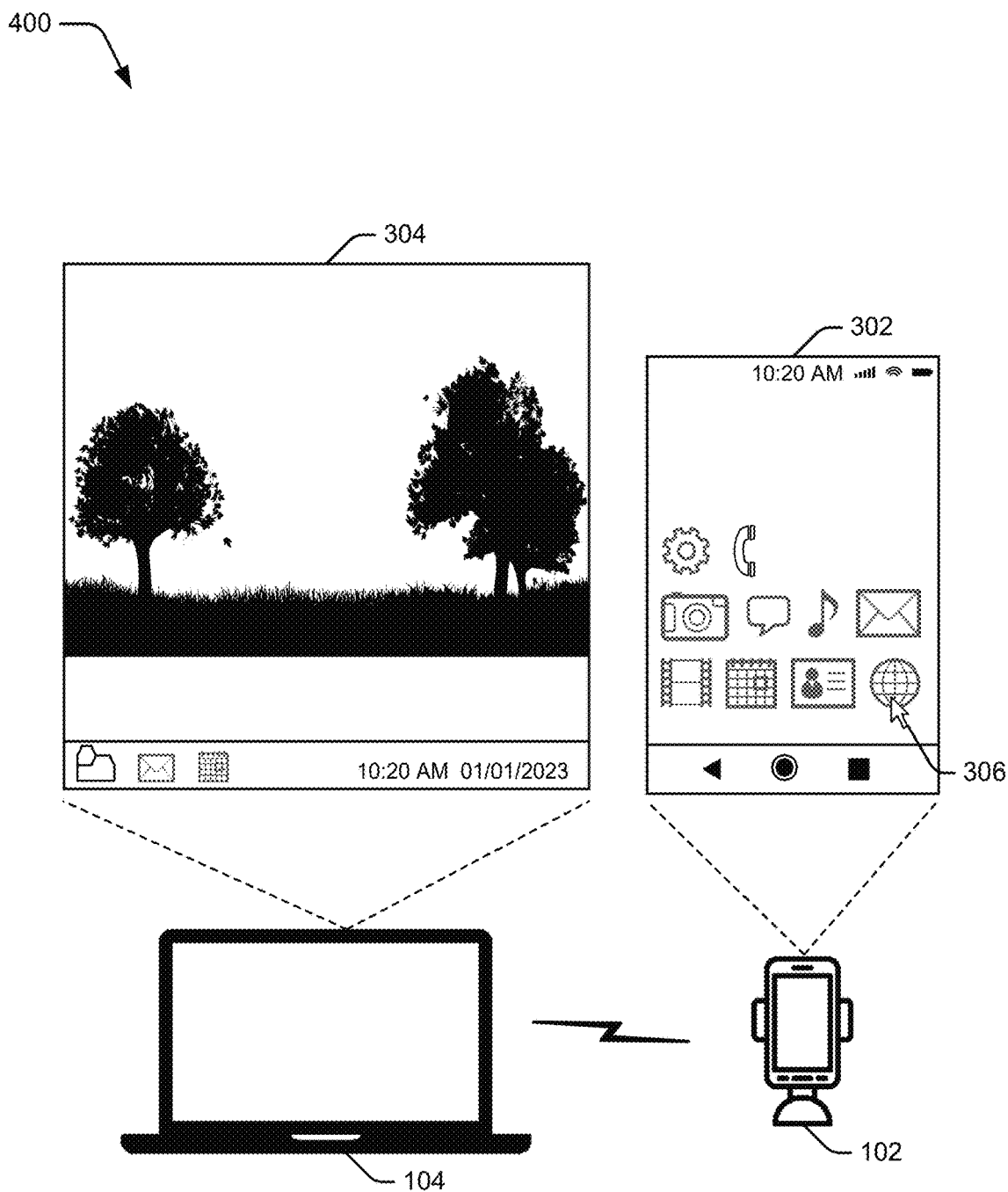

FIG. 4 illustrates an example 400 of using the techniques discussed herein. The example 400 includes the electronic device 102 displaying the user interface 302 and the electronic device 104 displaying the user interface 304. The example 400 is analogous to the example 300 of FIG. 3, except that the user input via the input control device of the electronic device 104 has resulted in the pointer 306 being located on the display of the electronic device 102. Accordingly, no pointer is displayed on the display of the electronic device 104. It should be noted that the pointer 306, although displayed on the display of the electronic device 102, is controlled by the input control device of the electronic device 104 (e.g., a trackpad that is part of the electronic device 104).

Figure 5:
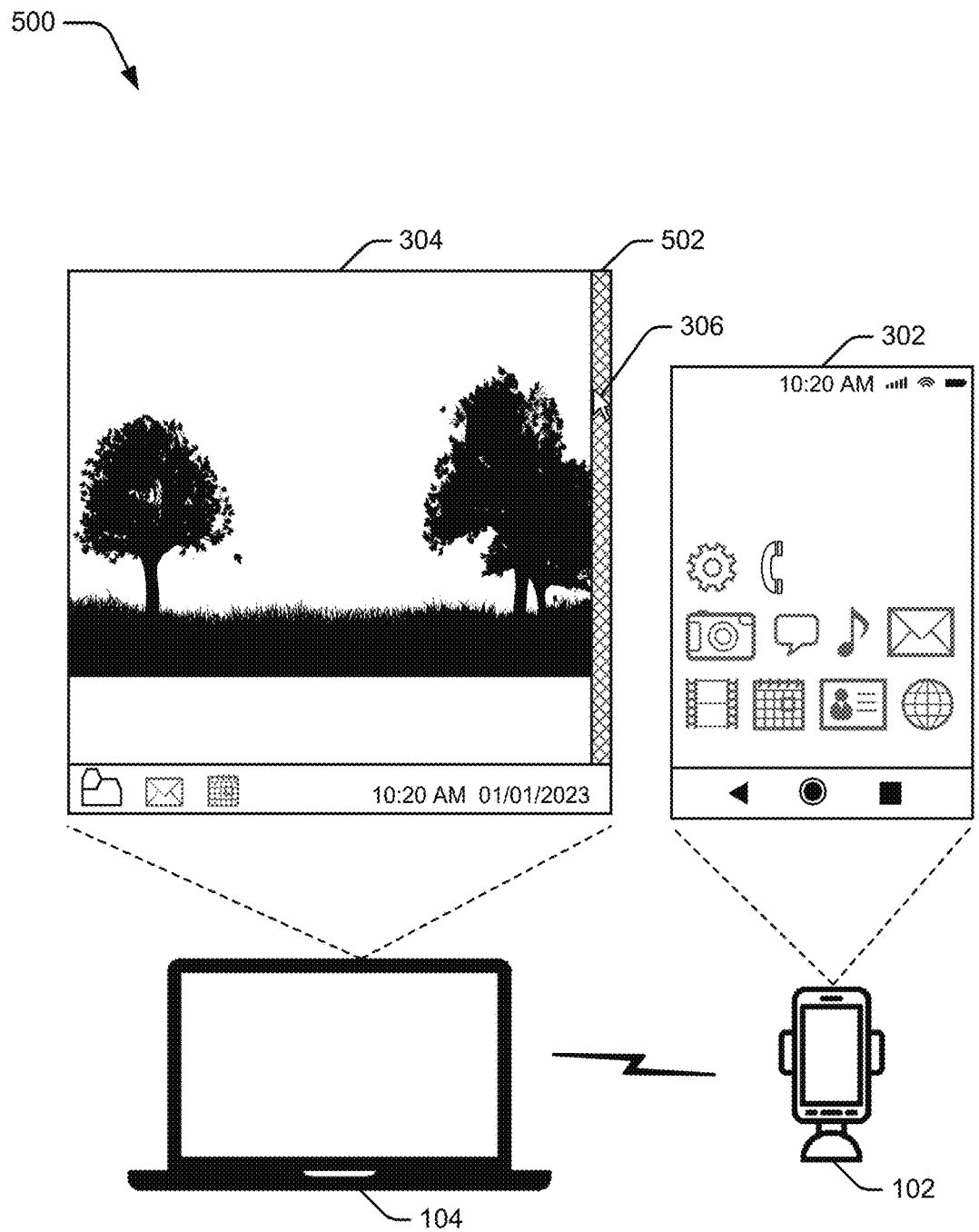

FIG. 5 illustrates an example 500 of using the techniques discussed herein. The example 500 includes the electronic device 102 displaying the user interface 302 and the electronic device 104 displaying the user interface 304. The example 500 is analogous to the example 300 of FIG. 3, except that the user input via the input control device of the electronic device 104 has resulted in the pointer 306 being located on the edge of the display of the electronic device 104 close to the display of the electronic device 102. A box 502 is displayed (illustrated with cross hatching) as an indication to the user that the user input is about to move the pointer 306 off the display of the electronic device 104 and onto the display of the electronic device 102.

Figure 6:
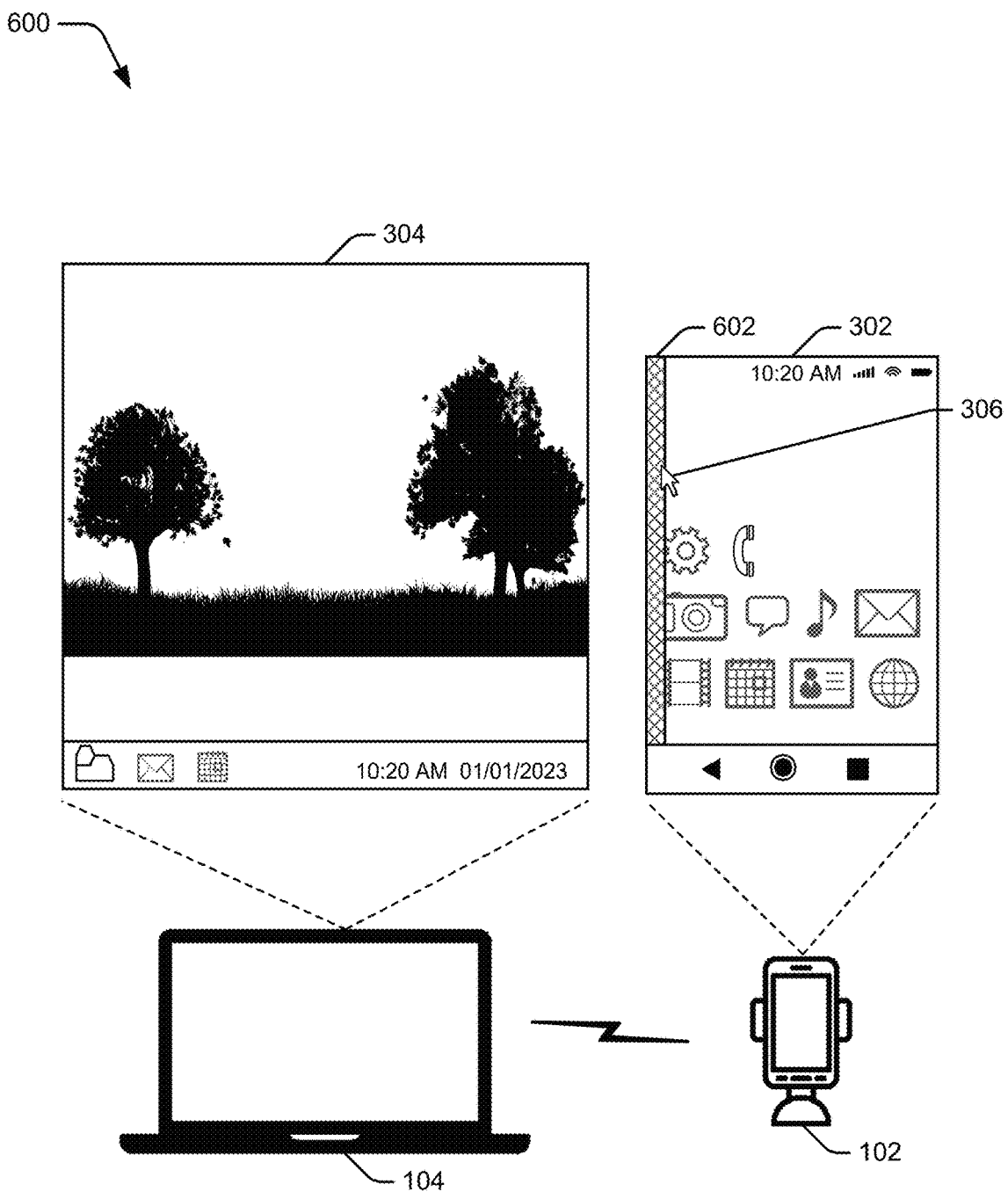

FIG. 6 illustrates an example 600 of using the techniques discussed herein. The example 600 includes the electronic device 102 displaying the user interface 302 and the electronic device 104 displaying the user interface 304. The example 600 is analogous to the example 400 of FIG. 4, except that the user input via the input control device of the electronic device 104 has resulted in the pointer 306 being located on the edge of the display of the electronic device 102 close to the display of the electronic device 104. A box 602 is displayed (illustrated with cross hatching) as an indication to the user that the user input is about to move the pointer 306 off the display of the electronic device 102 and onto the display of the electronic device 104.

Figure 7:
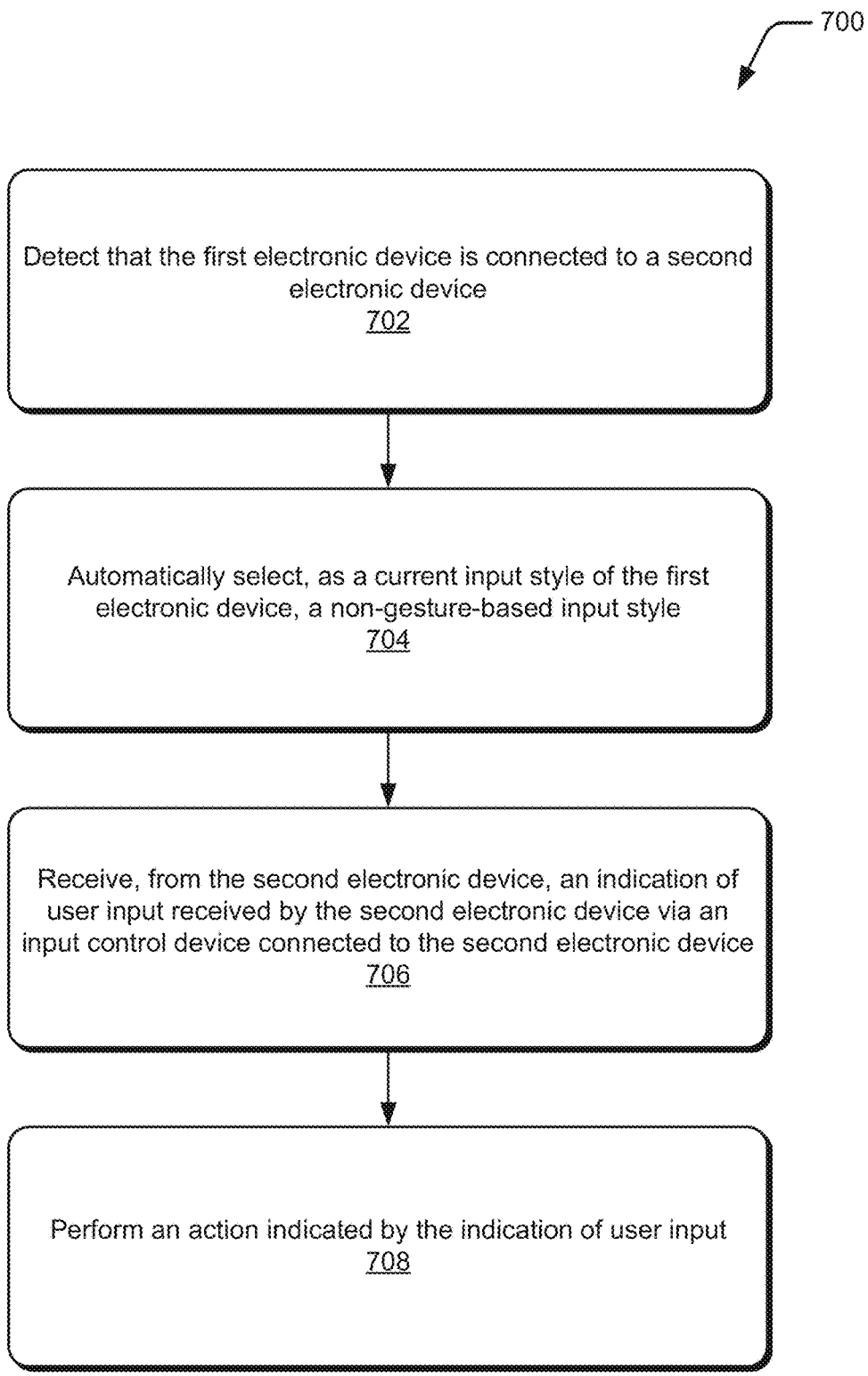
FIG. 7 illustrates an example process for implementing the techniques discussed herein in accordance with one or more embodiments.

FIG. 7 illustrates an example process 700 for implementing the techniques discussed herein in accordance with one or more embodiments. Process 700 is carried out by an automatic input style selection system, such as automatic input style selection system 120 of FIG. 1 or FIG. 2, and can be implemented in software, firmware, hardware, or combinations thereof. Process 700 is shown as a set of acts and is not limited to the order shown for performing the operations of the various acts.

In process 700, a first electronic device being connected to a second electronic device is detected (act 702). As discussed above, this connection can be a wireless connection or a wired connection.

A non-gesture-based input style is automatically selected as a current input style of the first electronic device (act 704). This automatic selection is performed in response to detecting that the first electronic device is connected to the second electronic device and optionally in response to detecting that universal control for the first electronic device has been activated.

An indication of user input received by the second electronic device is received from the second electronic device (act 706). The user input is received at the second electronic device via an input control device connected to the second electronic device.

An action indicated by the indication of user input is performed (act 708). This action can be moving a pointer or cursor, activating a button or switch, and so forth as discussed above.

Figure 8:
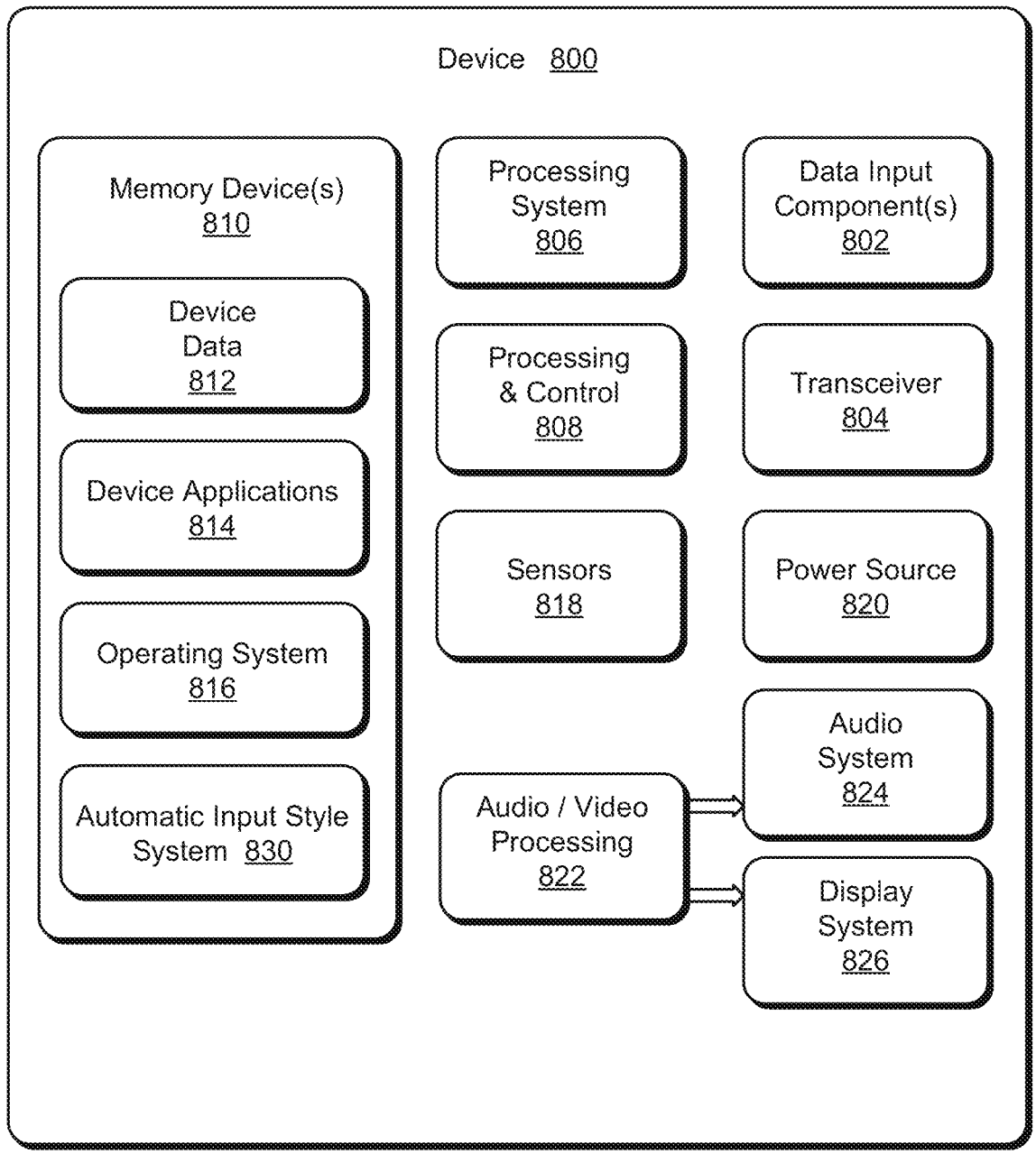
FIG. 8 illustrates various components of an example electronic device that can implement embodiments of the techniques discussed herein.

FIG. 8 illustrates various components of an example electronic device in which embodiments of automatic input style selection for a connected device can be implemented. The electronic device 800 can be implemented as any of the devices described with reference to the previous FIGs., such as any type of client device, mobile phone, tablet, computing, communication, entertainment, gaming, media playback, or other type of electronic device. In one or more embodiments the electronic device 800 is an electronic device 102 and the automatic input style system 830 includes the automatic input style selection system 120, described above. Additionally or alternatively, the electronic device 800 is an electronic device 104 described above.

The electronic device 800 includes one or more data input components 802 via which any type of data, media content, or inputs can be received such as user-selectable inputs, messages, music, television content, recorded video content, and any other type of text, audio, video, or image data received from any content or data source. The data input components 802 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 802 may also include various other input components such as microphones, touch sensors, touchscreens, keyboards, and so forth.

The device 800 includes communication transceivers 804 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 800 includes a processing system 806 of one or more processors (e.g., any of microprocessors, controllers, and the like) or a processor and memory system implemented as a system-on-chip (SoC) that processes computer-executable instructions. The processing system 806 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 808. The device 800 may further include any type of a system bus or other data and command transfer system that couples the various components within the device. A system bus can include any one or combination of different bus structures and architectures, as well as control and data lines.

The device 800 also includes computer-readable storage memory devices 810 that enable data storage, such as data storage devices that can be accessed by an electronic device, and that provide persistent storage of data and executable instructions (e.g., software applications, programs, functions, and the like). Examples of the computer-readable storage memory devices 810 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The device 800 may also include a mass storage media device.

The computer-readable storage memory device 810 provides data storage mechanisms to store the device data 812, other types of information or data, and various device applications 814 (e.g., software applications). For example, an operating system 816 can be maintained as software instructions with a memory device and executed by the processing system 806. The device applications 814 may also include a device manager, such as any form of a control application, software application, signal-processing and control module, code that is native to a particular device, a hardware abstraction layer for a particular device, and so on.

The device 800 can also include one or more device sensors 818, such as any one or more of an ambient light sensor, a proximity sensor, a touch sensor, an infrared (IR) sensor, accelerometer, gyroscope, thermal sensor, audio sensor (e.g., microphone), and the like. The device 800 can also include one or more power sources 820, such as when the device 800 is implemented as a computing device. The power sources 820 may include a charging or power system, and can be implemented as a flexible strip battery, a rechargeable battery, a charged super-capacitor, or any other type of active or passive power source.

The device 800 additionally includes an audio or video processing system 822 that generates one or both of audio data for an audio system 824 and display data for a display system 826. In accordance with some embodiments, the audio/video processing system 822 is configured to receive call audio data from the transceiver 804 and communicate the call audio data to the audio system 824 for playback at the device 800. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatic input style selection for a connected device have been described in language specific to features or methods, the subject of the appended claims is not necessarily limited to the specific features or methods described. Rather, the specific features and methods are disclosed as example implementations of techniques for implementing automatic input style selection for a connected device. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method, implemented in a first electronic device, the method including: detecting that the first electronic device is connected to a second electronic device; automatically selecting, as a current input style of the first electronic device in response to detecting that the first electronic device is connected to the second electronic device, a non-gesture-based input style; receiving, from the second electronic device, an indication of user input received by the second electronic device via an input control device connected to the second electronic device; and performing an action indicated by the indication of user input.

In some aspects, the techniques described herein relate to a method, further including: checking whether universal control for the first electronic device has been activated; and automatically selecting the non-gesture-based input style only if universal control for the first electronic device has been activated.

In some aspects, the techniques described herein relate to a method, further including: determining that universal control for the first electronic device has subsequently been deactivated; and returning the first electronic device to an input style the first electronic device had prior to selecting the non-gesture-based input style.

In some aspects, the techniques described herein relate to a method, wherein returning the first electronic device to the input style the first electronic device had prior to selecting the non-gesture-based input style includes returning the first electronic device to a gesture-based input style.

In some aspects, the techniques described herein relate to a method, wherein the first electronic device includes a mobile phone and the second electronic device includes a laptop computer.

In some aspects, the techniques described herein relate to a method, wherein the input control device includes a pointer control device.

In some aspects, the techniques described herein relate to a method, wherein a user interface displayed on the first electronic device is different than a user interface displayed on the second electronic device, and the user interface displayed on the first electronic device is not displayed on the second electronic device.

In some aspects, the techniques described herein relate to a method, further including: maintaining an indication of a previous input style of the first electronic device, the previous input style being an input style of the first electronic device prior to switching to the non-gesture-based input style; detecting that the first electronic device is disconnected from the second electronic device; and automatically switching, in response to detecting that the first electronic device is disconnected from the second electronic device, the current input style of the first electronic device to be the previous input style.

In some aspects, the techniques described herein relate to a method, the non-gesture-based input style being based on a tap on one or more buttons.

In some aspects, the techniques described herein relate to a method, further including displaying, on the first electronic device in response to the user input moving a pointer displayed on a display of the first electronic device within a threshold distance of an edge of the display of the first electronic device, an indication that the user input is close to moving a pointer off the display of the first electronic device and onto a display of the second electronic device.

In some aspects, the techniques described herein relate to a first electronic device, including: a processor implemented in hardware; and a computer-readable storage medium having stored thereon multiple instructions that, responsive to execution by the processor, cause the processor to: detect that the first electronic device is connected to a second electronic device; automatically select, as a current input style of the first electronic device in response to detecting that the first electronic device is connected to the second electronic device, a non-gesture-based input style; receive, from the second electronic device, an indication of user input received by the second electronic device via an input control device connected to the second electronic device; and perform an action indicated by the indication of user input.

In some aspects, the techniques described herein relate to a first electronic device, wherein the multiple instructions further cause the processor to: check whether universal control for the first electronic device has been activated; and automatically select the non-gesture-based input style only if universal control for the first electronic device has been activated.

In some aspects, the techniques described herein relate to a first electronic device, wherein the multiple instructions further cause the processor to: determine that universal control for the first electronic device has subsequently been deactivated; and return the first electronic device to an input style the first electronic device had prior to selecting the non-gesture-based input style.

In some aspects, the techniques described herein relate to a first electronic device, wherein the input control device includes a pointer control device.

In some aspects, the techniques described herein relate to a first electronic device, wherein the multiple instructions further cause the processor to: maintain an indication of a previous input style of the first electronic device, the previous input style being an input style of the first electronic device prior to switching to the non-gesture-based input style; detect that the first electronic device is disconnected from the second electronic device; and automatically switch, in response to detecting that the first electronic device is disconnected from the second electronic device, the current input style of the first electronic device to be the previous input style.

In some aspects, the techniques described herein relate to a first electronic device, wherein the multiple instructions further cause the processor to display, on the first electronic device in response to the user input moving a pointer displayed on a display of the first electronic device within a threshold distance of an edge of the display of the first electronic device, an indication that the user input is close to moving a pointer off the display of the first electronic device and onto a display of the second electronic device.

In some aspects, the techniques described herein relate to a first electronic device, including: an input style selection module, implemented at least in part in hardware, configured to detect that the first electronic device is connected to a second electronic device and to automatically select, as a current input style of the first electronic device in response to detecting that the first electronic device is connected to the second electronic device, a non-gesture-based input style; and an input control module, implemented at least in part in hardware, configured to receive, from the second electronic device, an indication of user input received by the second electronic device via an input control device connected to the second electronic device, and to perform an action indicated by the indication of user input.

In some aspects, the techniques described herein relate to a first electronic device, wherein the input style selection module is to: check whether universal control for the first electronic device has been activated; and automatically select the non-gesture-based input style only if universal control for the first electronic device has been activated.

In some aspects, the techniques described herein relate to a first electronic device, wherein the input style selection module is to: determine that universal control for the first electronic device has subsequently been deactivated; and return the first electronic device to an input style the first electronic device had prior to selecting the non-gesture-based input style.

In some aspects, the techniques described herein relate to a first electronic device, wherein the input control device includes a pointer control device.

In some aspects, the techniques described herein relate to a first electronic device, wherein the input style selection module is to: maintain an indication of a previous input style of the first electronic device, the previous input style being an input style of the first electronic device prior to switching to the non-gesture-based input style; detect that the first electronic device is disconnected from the second electronic device; and automatically switch, in response to detecting that the first electronic device is disconnected from the second electronic device, the current input style of the first electronic device to be the previous input style.

What is claimed is:

1. A method, implemented in a first electronic device, the method comprising:
   detecting that the first electronic device is connected to a second electronic device, the first electronic device configured to receive gesture-based input and the second electronic device configured to receive non-gesture-based input via an input control device connected to the second electronic device;
   automatically selecting, as a current input style of the first electronic device in response to detecting that the first electronic device is connected to the second electronic device, a non-gesture-based input style;
   in response to selecting the current input style, identifying one or more icons for display on a user interface of the first electronic device that indicate use of the input control device connected to the second electronic device to perform an action on the first electronic device in the non-gesture-based input style;
   receiving, from the second electronic device, an indication of user input received by the second electronic device via the input control device connected to the second electronic device; and
   performing the action indicated by the indication of user input.

2. The method of claim 1, further comprising:
   checking whether universal control for the first electronic device has been activated; and
   automatically selecting the non-gesture-based input style only if universal control for the first electronic device has been activated.

3. The method of claim 2, further comprising:
   determining that universal control for the first electronic device has subsequently been deactivated; and
   returning the first electronic device to an input style the first electronic device had prior to selecting the non-gesture-based input style.

4. The method of claim 3, wherein returning the first electronic device to the input style the first electronic device had prior to selecting the non-gesture-based input style comprises returning the first electronic device to a gesture-based input style.

5. The method of claim 1, wherein the first electronic device comprises a mobile phone and the second electronic device comprises a laptop computer.

6. The method of claim 1, wherein the input control device comprises a pointer control device.

7. The method of claim 1, wherein the user interface of the first electronic device is different than a user interface of the second electronic device, and the user interface displayed on the first electronic device is not displayed on the second electronic device.

8. The method of claim 1, further comprising:
   maintaining an indication of a previous input style of the first electronic device, the previous input style being an input style of the first electronic device prior to switching to the non-gesture-based input style;
   detecting that the first electronic device is disconnected from the second electronic device; and
   automatically switching, in response to detecting that the first electronic device is disconnected from the second electronic device, the current input style of the first electronic device to be the previous input style.

9. The method of claim 1, the non-gesture-based input style being based on a tap on one or more buttons.

10. The method of claim 1, further comprising displaying, on the first electronic device in response to the user input moving a pointer displayed on a display of the first electronic device within a threshold distance of an edge of the display of the first electronic device, an indication that the user input is close to moving a pointer off the display of the first electronic device and onto a display of the second electronic device.

11. A first electronic device, comprising:
   a processor implemented in hardware; and
   a computer-readable storage medium having stored thereon multiple instructions that, responsive to execution by the processor, cause the processor to:
      detect that the first electronic device is connected to a second electronic device, the first electronic device configured to receive gesture-based input and the second electronic device configured to receive non-gesture-based input via an input control device connected to the second electronic device;
      automatically select, as a current input style of the first electronic device in response to detecting that the first electronic device is connected to the second electronic device, a non-gesture-based input style;
      in response to selecting the current input style, identify one or more icons for display on a user interface of the first electronic device that indicate use of the input control device connected to the second electronic device to perform an action on the first electronic device in the non-gesture-based input style;
receive, from the second electronic device, an indication of user input received by the second electronic device via the input control device connected to the second electronic device; and
perform the action indicated by the indication of user input.

12. The first electronic device of claim 11, wherein the multiple instructions further cause the processor to:
check whether universal control for the first electronic device has been activated; and
automatically select the non-gesture-based input style only if universal control for the first electronic device has been activated.

13. The first electronic device of claim 12, wherein the multiple instructions further cause the processor to:
determine that universal control for the first electronic device has subsequently been deactivated; and
return the first electronic device to an input style the first electronic device had prior to selecting the non-gesture-based input style.

14. The first electronic device of claim 11, wherein the multiple instructions further cause the processor to:
maintain an indication of a previous input style of the first electronic device, the previous input style being an input style of the first electronic device prior to switching to the non-gesture-based input style;
detect that the first electronic device is disconnected from the second electronic device; and
automatically switch, in response to detecting that the first electronic device is disconnected from the second electronic device, the current input style of the first electronic device to be the previous input style.

15. The first electronic device of claim 11, wherein the multiple instructions further cause the processor to display, on the first electronic device in response to the user input moving a pointer displayed on a display of the first electronic device within a threshold distance of an edge of the display of the first electronic device, an indication that the user input is close to moving a pointer off the display of the first electronic device and onto a display of the second electronic device.

16. A first electronic device, comprising:
an input style selection module, implemented at least in part in hardware, configured to:
detect that the first electronic device is connected to a second electronic device, the first electronic device configured to receive gesture-based input and the second electronic device configured to receive non-gesture-based input via an input control device connected to the second electronic device;
automatically select, as a current input style of the first electronic device in response to detecting that the first electronic device is connected to the second electronic device, a non-gesture-based input style; and
in response to selecting the current input style, identify one or more icons for display on a user interface of the first electronic device that indicate use of the input control device connected to the second electronic device to perform an action on the first electronic device in the non-gesture-based input style; and
an input control module, implemented at least in part in hardware, configured to receive, from the second electronic device, an indication of user input received by the second electronic device via the input control device connected to the second electronic device, and to perform the action indicated by the indication of user input.

17. The first electronic device of claim 16, wherein the input style selection module is to:
check whether universal control for the first electronic device has been activated; and
automatically select the non-gesture-based input style only if universal control for the first electronic device has been activated.

18. The first electronic device of claim 17, wherein the input style selection module is to:
determine that universal control for the first electronic device has subsequently been deactivated; and
return the first electronic device to an input style the first electronic device had prior to selecting the non-gesture-based input style.

19. The first electronic device of claim 16, wherein the input style selection module is to:
maintain an indication of a previous input style of the first electronic device, the previous input style being an input style of the first electronic device prior to switching to the non-gesture-based input style;
detect that the first electronic device is disconnected from the second electronic device; and
automatically switch, in response to detecting that the first electronic device is disconnected from the second electronic device, the current input style of the first electronic device to be the previous input style.

20. The method of claim 1, wherein the one or more icons for display on the user interface of the first electronic device are based in part on a location of the first electronic device relative to the second electronic device.

* * * * *